H. E. ARGO.
GREASE CUP.
APPLICATION FILED MAY 31, 1918.

1,294,598.

Patented Feb. 18, 1919.

WITNESSES

INVENTOR
Horace E. Argo
BY
ATTORNEYS

UNITED STATES PATENT OFFICE.

HORACE E. ARGO, OF OAK PARK, ILLINOIS.

GREASE-CUP.

1,294,598.　　　　Specification of Letters Patent.　　Patented Feb. 18, 1919.

Application filed May 31, 1918. Serial No. 237,432.

*To all whom it may concern:*

Be it known that I, HORACE E. ARGO, a citizen of the United States, and a resident of Oak Park, in the county of Cook and State of Illinois, have invented certain new and useful Improvements in Grease-Cups, of which the following is a specification.

My invention is an improvement in grease cups, and consists in certain novel constructions and combinations of parts hereinafter described and claimed.

Referring to the drawings.

Figure 1:
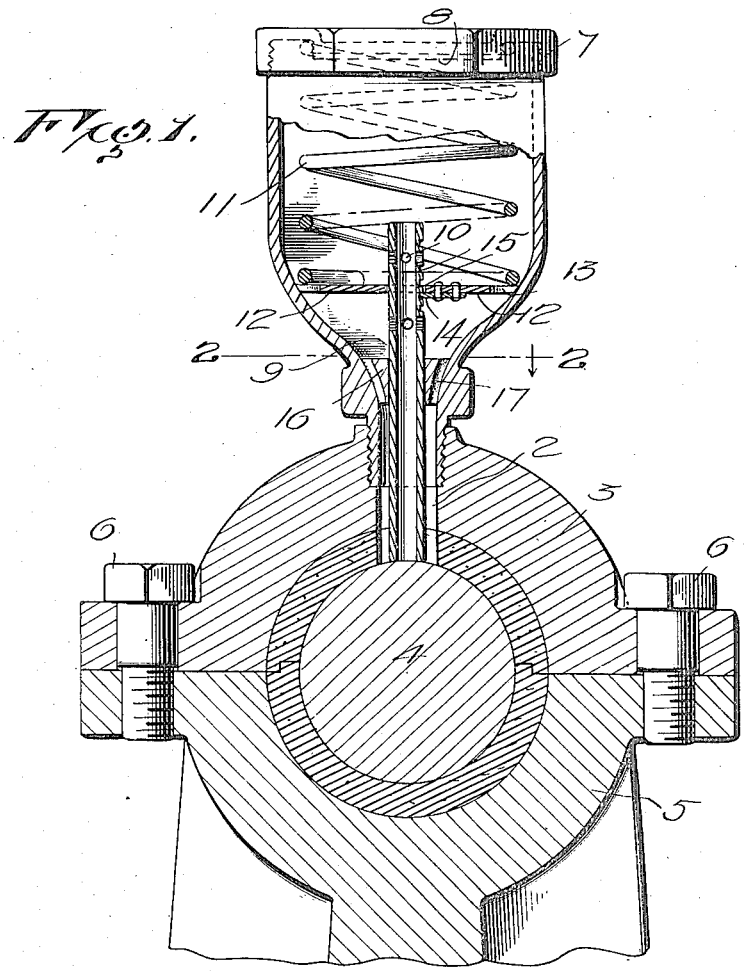
Figure 1 is a transverse vertical section of the improved cup.
Figure 2:
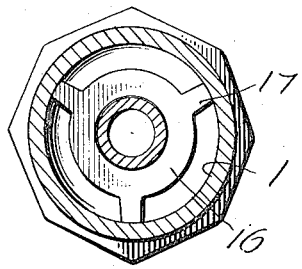
Fig. 2 is a section on the line 2—2 of Fig. 1, looking in the direction of the arrow adjacent to the line.
Figure 3:
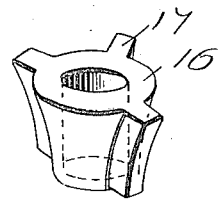
Fig. 3 is a perspective view of the spacing core or plug.

In the present embodiment of the invention, the oil cup 1 which is of usual construction has threaded engagement with an opening 2 in the upper section 3 of the bearing for the shaft 4, the said bearing consisting of the upper section 3 and a lower section 5 detachably connected as indicated at 6.

The cup 1 has a cover 7, which is threaded on to the cup, and is provided at its center with a circular depression indicated in dotted lines at 8. A tube 9 is mounted loosely in the opening 2 and in the cup, the said tube contacting at its lower end with the shaft 4, and this tube has its upper end open and is provided with radial openings 10 for permitting the grease to pass from the cup 1 through the tube to the bearing of the shaft.

A coil spring 11 is arranged within the oil cup, between the cover 7 and the perforate top of the tube or rod.

A device composed of a tube or rod with a concave perforate top, upon which the grease rests, and the lower end of the tube or rod touches the shaft or axle of the machine or vehicle, and a spacing core or plug resting in the lower or smaller end of the cup. This core or plug has a central opening through which the tube or rod moves up and down, governed by the action of the shaft or axle, and the tube or rod has radial wings or vanes engaging the wall of the cup. The core or plug prevents any side play of the tube or rod, which might otherwise cause serious damage to the machine or vehicle. The core or plug tapers downward from the top and the vanes are of equal length, eliminating any possibility of the core or plug slipping lower in the cup. The grease passes through the ports in the concave perforate top of the tube or rod, then through the grooves between the radial wings or vanes of the core or plug on to the shaft or axle of the machine or vehicle.

A coil spring is arranged within the cup, between the cup cover and the concave perforate top of the tube or rod, forcing the tube or rod down, after the action of the shaft or axle forces up the tube or rod.

The action of the spring also keeps the grease soft to a certain degree, facilitating quicker passage of the same.

I claim:

In a bearing, the combination with the oil cup, the shaft, and the bearing for the shaft having an opening for the oil cup, the said cup having a reduced portion for engaging the opening, of a tube arranged within the cup and extending through the reduced portion and engaging the shaft at one end, the ends of the tubes being open, and springs normally pressing the tube toward the shaft, means for varying the tension of the spring, and a spacer for holding the tube at the center of the cup, said spacer comprising a collar encircling the tube and having radial lugs for engaging the cup.

HORACE E. ARGO.